(Model.)

S. M. DOUGHERTY.
Tobacco Leaf Cutting Knife.

No. 230,116.  Patented July 20, 1880.

Witnesses:
J. E. Hurt
J. Husson

Inventor:
Simon M. Dougherty
per Hew Stauffer
Attorneys.

UNITED STATES PATENT OFFICE.

SIMON M. DOUGHERTY, OF LANCASTER, PENNSYLVANIA.

TOBACCO-LEAF-CUTTING KNIFE.

SPECIFICATION forming part of Letters Patent No. 230,116, dated July 20, 1880.

Application filed April 17, 1880. (Model.)

*To all whom it may concern:*

Be it known that I, SIMON M. DOUGHERTY, of Lancaster city, in the county of Lancaster and State of Pennsylvania, have invented a new and useful Improvement in Tobacco-Leaf-Cutting Knives, which improvement is fully set forth in the following specification and accompanying drawings.

The invention relates to tobacco-leaf-cutting knives, used chiefly by cigar-makers for cutting the wrapper-leaf of the cigar.

The principal objection to the ordinary cigar-maker's knife is the fact that after using it for a short time a gummy substance collects on the blade near its cutting-edge, and unless this gum is frequently removed the wrapper-leaf, while being trimmed, is liable to adhere to the blade, and in the act of cutting the leaf is often torn and rendered useless for the purpose intended. Heretofore the custom has been to remove this gum by drawing the blade horizontally between the lips, to which the gum would adhere, leaving the blade clean and ready for use. This method is not only inconvenient and unpleasant, but its necessarily frequent repetition is a great waste of time and no doubt injurious to the health.

The object of my invention is to prevent the collection of this gum on the blade, and thus overcome the objections above mentioned.

The invention consists of the ordinary cigar-maker's knife-blade, attached to a hollow metallic handle closed at the end by a movable cap, said handle having a small cylindrical extension or tube extending along the back of the blade to within a short distance of the end. Near the end of the tube there is quite a small opening, on each side of the blade, which is the only opening in the tube, the end being closed.

Figure 1:
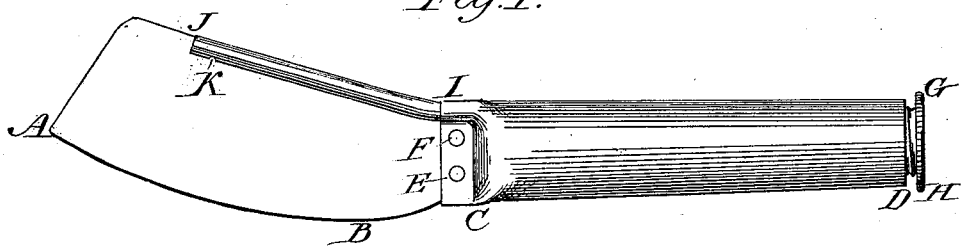
Figure 2:
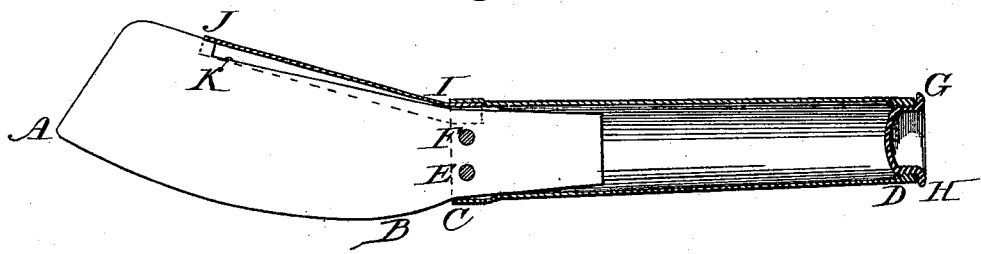

In the accompanying drawings, Figure 1 is a perspective view, and Fig. 2 a longitudinal section, of one form of the knife, in which similar letters of reference indicate like parts.

The blade A B is attached to the hollow handle C D by the rivets E and F. G H is the screw-cap closing the handle, and I J is the hollow tube or extension along the back of the blade.

At K is the small opening to admit of a slight discharge of water or other liquid which the handle may contain.

When in use the handle C D is filled with water and then closed by the cap G H. The handle and tube being communicating, the simple motion of the knife when in the act of cutting will force sufficient water from the small perforations in the tube to keep the blade wet, and thus prevent the collection of sufficient gum to interfere with the cutting. The blade is thus kept in order as long as any water remains in the handle, and the cigar-maker is saved from any loss of time and great annoyance.

What I claim, therefore, as my invention is—

The knife with a hollow handle, made to contain a liquid, with a forward extension or delivery-tube, whereby a small quantity is thrown upon the blade at each stroke of the knife, in the manner substantially as described.

SIMON M. DOUGHERTY.

Witnesses:
ALLAN A. HERR,
J. E. HERR.